No. 696,370. Patented Mar. 25, 1902.
H. TRAEGER.
JOINTER FOR PLOWS.
(Application filed June 26, 1901.)
(No Model.)
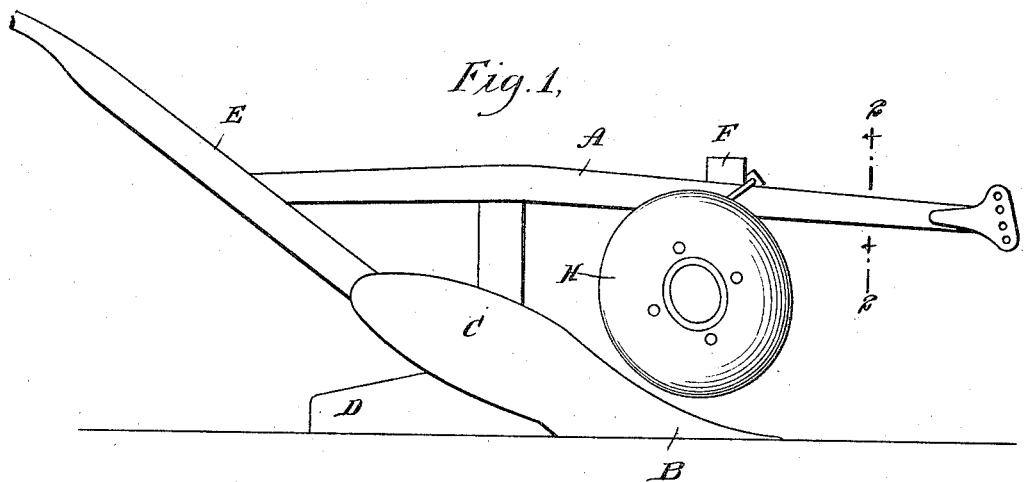
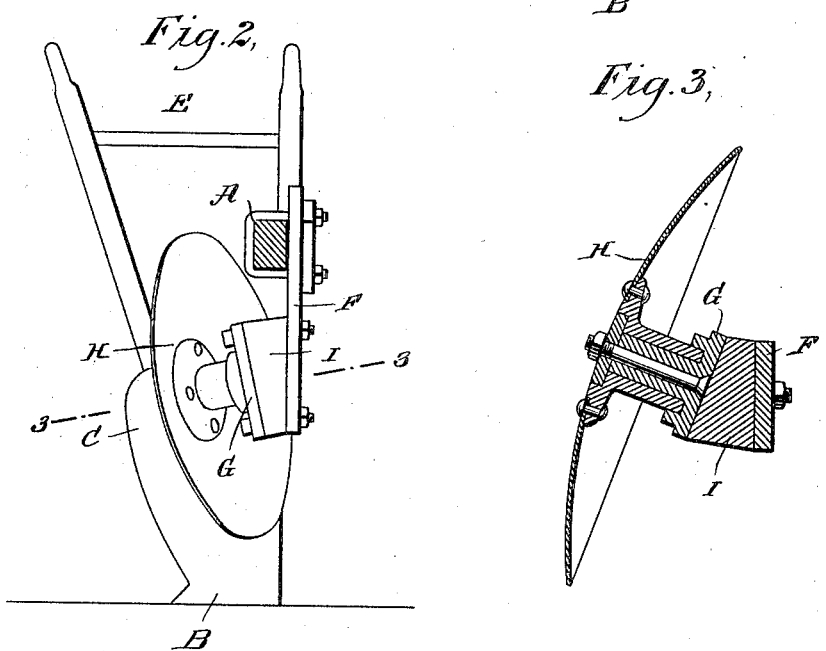
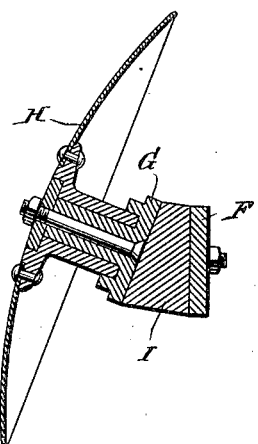
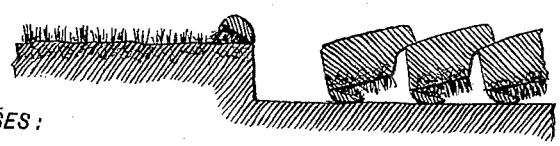
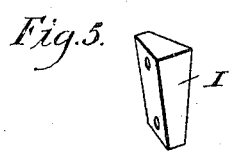
WITNESSES:
Edward Thorpe
Rev. J. Hosler
INVENTOR
Henry Traeger
BY
ATTORNEYS

UNITED STATES PATENT OFFICE.

HENRY TRAEGER, OF AUBURN, WASHINGTON.

JOINTER FOR PLOWS.

SPECIFICATION forming part of Letters Patent No. 696,370, dated March 25, 1902.

Application filed June 26, 1901. Serial No. 66,090. (No model.)

*To all whom it may concern:*

Be it known that I, HENRY TRAEGER, a citizen of the United States, and a resident of Auburn, in the county of King and State of Washington, have invented a new and Improved Jointer for Plows, of which the following is a full, clear, and exact description.

The object of the invention is to provide a new and improved jointer for plows arranged to form a very good joint between adjacent layers of the turned-over ground to throw the trash and sod the opposite way from which the plow turns it, so that when the jointer is attached to a right-hand plow, for instance, it throws a narrow strip of the sod or trash to the left, while the main portion of the ground is turned over to the right.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement as applied to a right-hand plow. Fig. 2 is an enlarged cross-section of the same on the line 2 2 in Fig. 1. Fig. 3 is a sectional plan view of the same on the line 3 3 in Fig. 2. Fig. 4 is a sectional elevation of the land partly plowed with a plow having the jointer attached, and Fig. 5 is a perspective view of the double wedge for giving the desired inclination to the jointer.

The plow on which the improvement is applied is constructed in the usual manner and consists, essentially, of a plow-beam A, a share B, a moldboard C, a landside D, and handles E to be taken hold of by the operator for directing the plow in the proper manner. On the plow-beam A is clipped or otherwise secured a bracket F, extending downwardly above the share B, as is plainly illustrated in the drawings, and to the outside of the said bracket F is bolted or otherwise attached a bearing G, on which is mounted to turn a jointer H in the shape of a dished wheel, as is plainly indicated in Figs. 1, 2, and 3. A double wedge I is interposed between the bracket F and the bearing G, so as to incline the axis of the bearing G and the jointer H rearwardly and downwardly (see Figs. 2 and 3) to cause the jointer H to cut a portion of the ground in advance of the plowshare and moldboard and to throw said cut-off portion in the opposite direction to which the moldboard turns over the ground, so that this cut-off portion passes upon the land side, as indicated in Fig. 4. Now it is evident that by the arrangement described the jointer H cuts off a portion of the ground in such a manner that when the ground is thrown over it forms a perfect joint with the ground previously thrown over and with all the stubble, trash, and other worthless material completely turned under, as will be readily understood by reference to Fig. 4. It is expressly understood that the jointer does not in any sense form a colter heretofore used. It is also expressly understood that the dished jointer H has its concave face standing toward the land side, and as the axis of said jointer is inclined rearwardly and downwardly it is evident that the ground cut by the jointer on the forward movement of the plow is thrown over upon the land side, as illustrated in Fig. 4 and above described.

Having thus fully described my invention, I claim as new and desire to secure by Letters Patent—

1. A jointer for plows, comprising a bracket to be detachably secured to a plow-beam, a double wedge mounted on said bracket, a bearing mounted on said double wedge and inclined rearwardly and downwardly therefrom, and a dished cutter revolubly mounted upon said bearing and so disposed that the concave face of said cutter is directed toward the land side, the arrangement being such that said cutter removes a small portion of the soil and turns it over toward the land side in front of the plow.

2. A jointer for plows, comprising a bracket to be detachably secured upon a plow-beam so as to depend rigidly therefrom, a double wedge mounted upon said bracket, a bearing mounted upon said double wedge and projecting slightly rearward therefrom, a cutter provided with concaved and convexed faces and mounted upon said bearing, the concaved face of said cutter being disposed toward said wedge and inclined at a slight angle toward the front of the plow, the arrangement being such that the cutter removes a small portion of the soil in front of the plow and throws the same toward the land side.

3. A plow comprising a beam, the plow thereon, and the jointer connected with the beam by a connection extending from the concaved side of the jointer, the said jointer having its lowest edge higher than the plow-point and in advance thereof, and converging rearwardly and downwardly to the plane of the land side.

4. A plow, comprising a plow-beam, a bearing connected therewith and inclined rearwardly and downwardly therefrom, a dished cutter revolubly mounted upon said bearing and so disposed that the concaved face of the said cutter is directed to the land side, the arrangement being such that said cutter removes a small portion of the soil and turns it over toward the land side in front of the plow.

In testimony whereof I have signed my name to this specification in the presence of two subscribing witnesses.

HENRY TRAEGER.

Witnesses:
ELEAZER P. WHITNEY,
MICHAEL STAHL.